(12) United States Patent
Sinivaara et al.

(10) Patent No.: US 8,331,860 B2
(45) Date of Patent: Dec. 11, 2012

(54) CONTROL OF PERIPHERAL DEVICES IN A SHORT-RANGE WIRELESS COMMUNICATION SYSTEM

(75) Inventors: Hasse Sinivaara, Espoo (FI); Jari Jokela, Ylojarvi (FI)

(73) Assignee: Nokia Corporation, Espoo (FI)

( * ) Notice: Subject to any disclaimer, the term of this patent is extended or adjusted under 35 U.S.C. 154(b) by 938 days.

(21) Appl. No.: 11/630,969

(22) PCT Filed: Jun. 29, 2004

(86) PCT No.: PCT/FI2004/000399
§ 371 (c)(1),
(2), (4) Date: Feb. 23, 2007

(87) PCT Pub. No.: WO2006/000615
PCT Pub. Date: Jan. 5, 2006

(65) Prior Publication Data
US 2007/0249331 A1  Oct. 25, 2007

(51) Int. Cl.
*H04B 7/00* (2006.01)
(52) U.S. Cl. ........... 455/41.2; 455/41.3; 455/420
(58) Field of Classification Search ........... 455/41.2, 455/41.3, 515, 410, 411, 422.1, 414.1–414.3, 455/415, 420, 424, 426.1, 434, 435.1, 7–9, 455/11.1, 12.1, 13.1, 13.2, 14–17; 370/338, 370/462, 461
See application file for complete search history.

(56) References Cited

U.S. PATENT DOCUMENTS

| | | | |
|---|---|---|---|
| 6,148,346 A * | 11/2000 | Hanson | 719/321 |
| 6,430,285 B1 * | 8/2002 | Bauer et al. | 379/265.01 |
| 6,678,750 B2 * | 1/2004 | Meade et al. | 710/7 |
| 6,732,195 B1 * | 5/2004 | Baldwin | 710/6 |
| 6,744,750 B1 * | 6/2004 | Berger | 370/337 |
| 6,973,077 B1 * | 12/2005 | Olsson et al. | 370/359 |
| 7,089,577 B1 * | 8/2006 | Rakib et al. | 725/87 |
| 7,123,702 B1 * | 10/2006 | Pershan | 379/114.01 |
| 7,164,907 B2 * | 1/2007 | Cochran et al. | 455/419 |
| 7,194,079 B1 * | 3/2007 | Straub et al. | 379/211.02 |
| 7,239,689 B2 * | 7/2007 | Diomelli | 379/114.02 |
| 7,447,761 B1 * | 11/2008 | Ferguson et al. | 709/224 |
| 7,672,991 B2 * | 3/2010 | Moreau et al. | 709/203 |

(Continued)

FOREIGN PATENT DOCUMENTS

WO   WO 02/103967   12/2002

OTHER PUBLICATIONS

Office Action in European Application No. 04 742 142.5 dated Aug. 5, 2010.

*Primary Examiner* — Dominic E Rego
(74) *Attorney, Agent, or Firm* — Alston & Bird LLP (57) ABSTRACT

The invention relates to a mechanism for using services provided by a network in an environment including user-operated short-range wireless terminals and short-range wireless peripheral devices, such as wireless storage units, controllable by the user-operated terminals. A wireless peripheral device is informed that a network providing services is to be accessed, as a result of which the wireless peripheral device accesses the said network. A service is then selected from the infrastructure network by the user-operated terminal, while also indicating that the party requesting the selected service is the peripheral device. The selected service is delivered to the wireless peripheral device through the infrastructure network.

26 Claims, 3 Drawing Sheets

U.S. PATENT DOCUMENTS

| | | | |
|---|---|---|---|
| 2002/0006212 A1* | 1/2002 | Rhoads et al. | 382/100 |
| 2002/0052965 A1* | 5/2002 | Dowling | 709/230 |
| 2002/0081993 A1* | 6/2002 | Toyoshima | 455/410 |
| 2002/0184304 A1* | 12/2002 | Meade et al. | 709/203 |
| 2002/0194285 A1* | 12/2002 | Mousseau et al. | 709/206 |
| 2003/0035010 A1* | 2/2003 | Kodosky et al. | 345/771 |
| 2003/0129944 A1* | 7/2003 | Chang et al. | 455/41 |
| 2003/0217192 A1* | 11/2003 | White et al. | 709/321 |
| 2004/0071122 A1* | 4/2004 | Svensson et al. | 370/338 |
| 2004/0162027 A1* | 8/2004 | Chang | 455/41.2 |
| 2005/0027807 A1* | 2/2005 | Fengler et al. | 709/206 |
| 2005/0198245 A1* | 9/2005 | Burgess et al. | 709/223 |
| 2005/0232285 A1* | 10/2005 | Terrell et al. | 370/401 |
| 2005/0285934 A1* | 12/2005 | Carter | 348/14.06 |
| 2008/0090626 A1* | 4/2008 | Griffin et al. | 455/575.1 |
| 2010/0050009 A1* | 2/2010 | LeFevre et al. | 713/340 |

* cited by examiner

CONTROL OF PERIPHERAL DEVICES IN A SHORT-RANGE WIRELESS COMMUNICATION SYSTEM

FIELD OF THE INVENTION

The invention relates to short-range wireless communication systems where beacon frames are broadcast and which include user-operated short-range wireless terminals. More specifically, the invention relates to control of a wireless peripheral device in such a system.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In a typical network of this type, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network or set up an ad-hoc network. In an infrastructure network an access point and at least one terminal is said to form a Basic Serving Set (BSS), while an ad-hoc network is also termed an Independent BSS (IBSS).

Wireless networked solutions are becoming more popular in various environments, and the market of wireless consumer devices is expected to grow rapidly within the next few years. Many of these devices will not have a separate user interface, for example, but are instead controlled wirelessly through a user-operated device. The user-operated devices will typically be small devices with a limited amount of memory, which means that large amounts of data will be stored on separate disks or in other storage devices wirelessly connected to the user-operated devices. In this context, the user-operated controlling devices are also termed host devices, while the devices controlled by the host devices are termed peripheral devices. A peripheral device here refers to a device that is not part of a user-operated short-range wireless terminal but controllable by that terminal.

The above division of functional entireties into physically separate compact units will cause problems in the control and operation of the peripheral devices. For example, downloading large amounts of content to a separate wireless storage will be cumbersome, due to the fact that the storages will not be "complete" devices as the present-day laptop computers, for example. Therefore, content has to be downloaded through the user-operated controlling devices, which may in turn have a limited memory space for storing data. Apart from being cumbersome, the downloading is a prolonged operation, which also reserves resources from the user-operated controlling device.

The present invention seeks to accomplish a solution by means of which the above drawbacks related to wireless peripheral devices may be alleviated.

SUMMARY OF THE INVENTION

The present invention seeks to devise a new mechanism for using services provided by a network in an environment including user-operated short-range wireless terminals (i.e. host devices) and short-range wireless peripheral devices, such as wireless storage units controllable by the user-operated terminals.

In the present invention, a peripheral device is commanded to follow a host device to the network accessed by the host device. The host device may then select a service, such as a download, from the network, and as soon as it knows the network address of the peripheral device, it may control a service delivery to take place between the accessed network and the peripheral device.

According to one embodiment of the invention, a method for controlling a short-range wireless peripheral device includes the steps of informing a wireless peripheral device that an infrastructure network providing services is to be accessed, the informing step being initiated from a wireless host device, establishing, in response to the informing step, a connection between the infrastructure network and the wireless peripheral device, and selecting a service from the infrastructure network, the selecting step being performed at the wireless host device. The method further includes the steps of indicating to an entity providing the service that the peripheral device requests the service and delivering the service to the wireless peripheral device through the infrastructure network.

In a further aspect the invention provides a short-range wireless communication system. The system includes first means for informing a wireless peripheral device that an infrastructure network providing services is to be accessed and second means, responsive to the first means, for establishing a connection between the infrastructure network and the wireless peripheral device. The system further includes third means for selecting a service available in the infrastructure network and fourth means for indicating to an entity providing the service that the peripheral device requests the service, wherein the third and fourth means reside in a short-range wireless host device other than said wireless peripheral device, the wireless host device being operable by a user.

In a still further aspect the invention provides a wireless terminal for wireless short-range networks. The wireless terminal includes first means for informing a wireless peripheral device that an infrastructure network providing services is to be accessed, second means for selecting a service from the infrastructure network, and third means for indicating to an entity providing the service that the wireless peripheral device requests the service.

In a further embodiment, the invention provides a user interface for a short-range wireless terminal. The user interface includes a display for displaying a service object to a user, the service object representing a service provided in an infrastructure network and a first controller configured to create, in response to a predetermined event, a device symbol onto a screen of the display, the device symbol representing an external wireless peripheral device. The user interface further includes user-operated pointing means for creating an association between the service object and the device symbol and a second controller configured to indicate, in response to the association created, to an entity providing the service that the peripheral device requests the service.

In a still further embodiment, the invention provides a computer useable medium having computer readable program code embodied therein to control a short-range wireless terminal. The computer readable program code includes a first computer readable program code portion for causing the short-range wireless terminal to inform a wireless peripheral device that an infrastructure network providing services is to be accessed and a second computer readable program code portion for causing the short-range wireless terminal to indicate to an entity providing a service in the infrastructure network that the wireless peripheral device requests the service.

By means of the solution of the invention, a peripheral device may be commanded to access the same service providing network as the host devices accesses, and the service delivery may be controlled to take place directly to the peripheral device. As the host device may be bypassed in the delivery phase of the service, the use of the services becomes more user-friendly, and the battery consumption of the host device is lowered. Furthermore, the services may be delivered quicker than before.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIGS. 1 to 5c in the appended drawings, wherein.

DETAILED DESCRIPTION OF THE INVENTION

Figure 1:
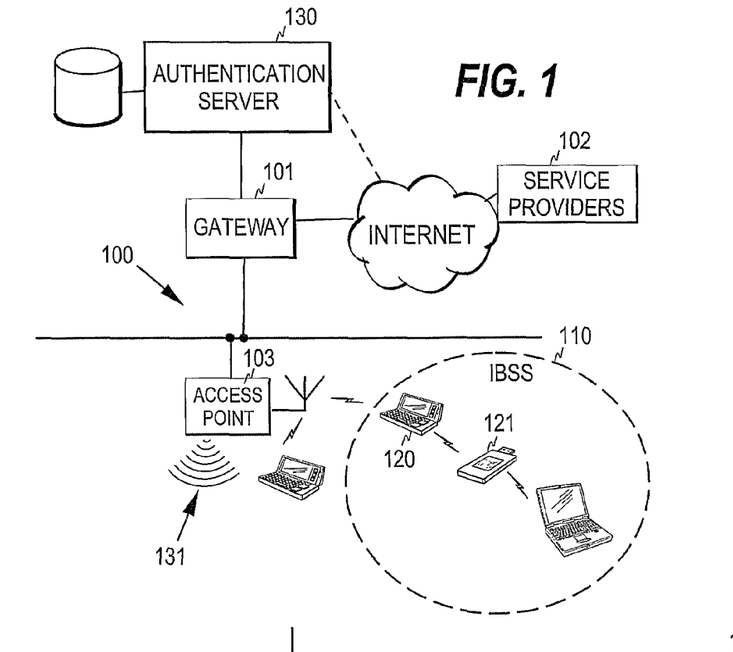
FIG. 1 illustrates an example of a communication environment including an ad-hoc network.

Wireless or cordless host and peripheral devices may be based on different short-range radio technologies, such as WLAN or Bluetooth. It is assumed in the following examples that these peripheral devices utilize WLAN technology. FIG. 1 illustrates a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

As mentioned above, in an infrastructure network an access point and at least one terminal is said to form a Basic Serving Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110.

The terminals, i.e. the peripheral and host devices, are thus short-range wireless/cordless devices, which are in this example based on the IEEE 802.11 standards for wireless local area networking. User-operated terminals, i.e. host devices, may be portable computers, PDA equipment, intelligent phones, or other such mobile terminals 120. In the same way as an ordinary GSM telephone, the user-operated terminals may be made up of two parts: the actual subscriber device, e.g. a portable computer (with software), and an identity module, whereby from the viewpoint of the network the device becomes a functioning terminal only when the identity module has been inserted into it. The identity module may be a (Universal) Subscriber Identity Module ((U)SIM), User Identity Module (UIM) or a (User) Integrated Circuit Card ((U)ICC), for example. The peripheral devices 121 may be various auxiliary devices, such as printers or storage units that are typical in office or home environments, and they may also be provided with a separate identity module. Such as the host devices, the peripheral devices may also operate in an ad-hoc network and access the service providing network.

The system further typically contains an authentication server 130 of the WLAN network. The authentication server may be connected to the above-mentioned gateway through a secured connection, which is typically a TCP/IP connection established through an operator network or through the Internet. As discussed below, in an infrastructure network the access points broadcast beacon messages 131, while in an ad-hoc network the terminals share this responsibility.

As the present invention does not relate to the architecture of the system, it is not discussed in more detail here.

Figure 2:
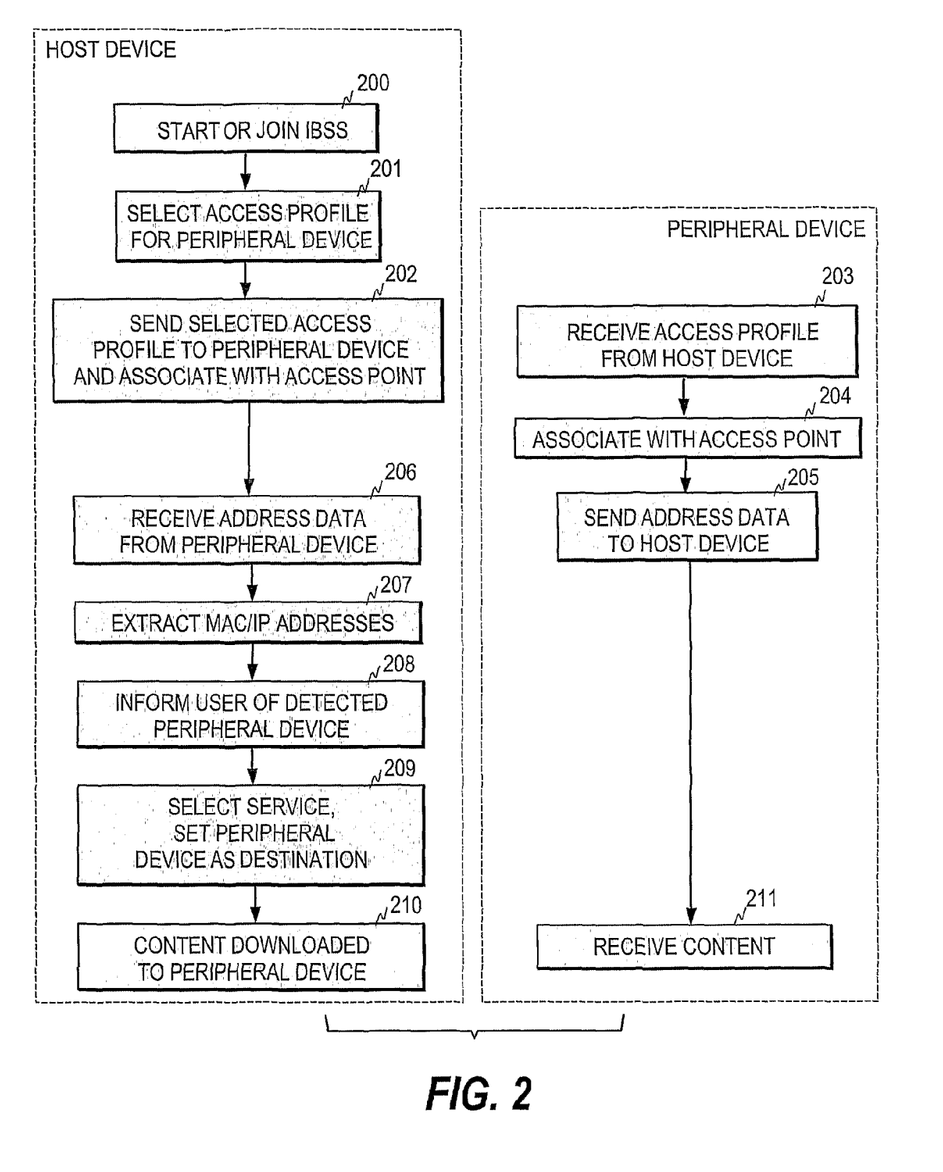
FIG. 2 is a flow diagram illustrating one embodiment of the invention.
Figure 3:
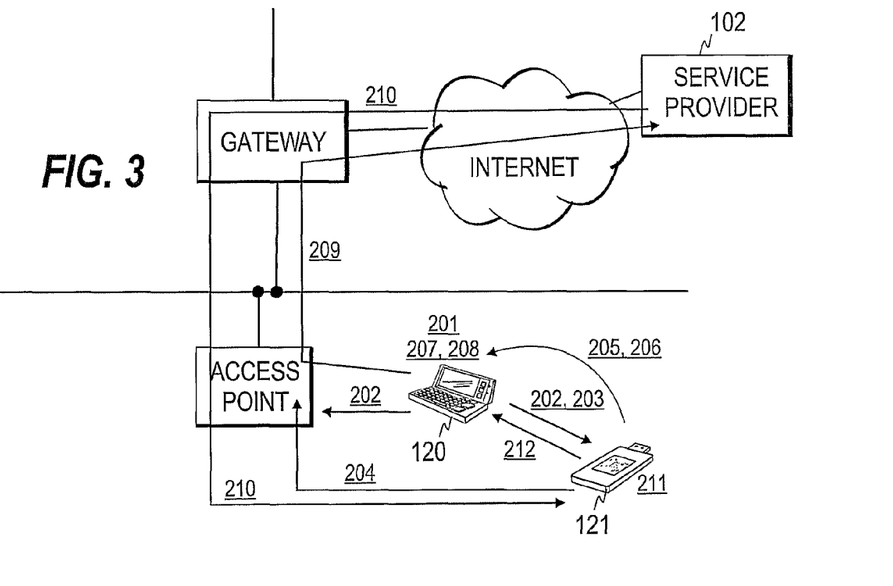
FIG. 3 illustrates the steps of FIG. 2 in the environment of FIG. 1.

FIG. 2 is a flow diagram illustrating one embodiment of the invention. The left side of the figure shows the operations performed in a host device, while the right side shows the operations performed in a peripheral device controlled by the said host device. FIG. 3 illustrates the steps of FIG. 2, assuming that a host device 120 controls a storage unit 121 in the environment shown in FIG. 1. The steps corresponding to the steps of FIG. 2 are shown by arrows provided with like reference numbers.

Referring to FIG. 2, the host device may first start or join an IBSS (step 200), although this is not necessary as discussed below. When the user wishes to download content from a service provider to the peripheral device, he/she first selects an access profile for the peripheral device. The host device may store several access profiles from among which a suitable one is selected for the peripheral device. The access profile is a data unit that includes the parameters needed for accessing the infrastructure network, i.e. the service providing network, in the current communication environment. The access profile typically includes the identifier of the local access point and various security parameters. The host device then sends the access profile to the peripheral device and associates with the access point using the said access profile (step 202). The access profile serves as a "follow me" command by means of which the host device commands the peripheral device to follow the host device to the infrastructure network.

The access profile may be transferred to the peripheral device in various ways. For example, the profile may be sent within an IBSS if the two devices are members of the same IBSS. The profile may also be transferred to the peripheral device through another short-range radio interface, such as a radio frequency identification (RFID) interface or a Bluetooth interface, in proximity communication between the two devices. The host device may initiate the transfer by touching the peripheral device, for example. Thus, the devices do not necessarily have to be members in an IBSS at this stage of the process.

Upon receiving the access profile from the host device the peripheral device associates with the access point using the said profile (step 204). Next, the peripheral device notifies the host device that it has accessed the network (steps 205 and 206). The peripheral device may, for example, broadcast a data frame to the host device within an IBSS. The frame may include the MAC address of the peripheral device and the IP address of the peripheral device, which the peripheral device received from the access point in connection with the association (step 204). The host device may then extract the MAC and IP addresses of the peripheral device from the received message (step 207). The address data may also be transferred to the host device through the above-mentioned another radio interface intended for proximity communication.

Consequently, the application in the host device is now aware of the peripheral device and its address in the service providing network. This may be indicated to the user for example by creating a new icon representing the peripheral device and displaying the icon through the user interface of the host device (step 208).

The user may now browse content on content servers and select the content to be downloaded to the peripheral device (step 209). When the user has made the selection, he/she further indicates that the storage unit 121 is the destination of the selected content. This may be performed, for example, by indicating to the host device application that the destination is the device corresponding to the newly created icon. The user operations are discussed below in connection with FIGS. 5a to 5c, which illustrate an example of the user interface of the terminal.

The host device application then sends a service request that includes the network address of the peripheral device. The service request may include the network address of the peripheral device only or the network addresses of both the peripheral device and the host device. In the former case, the host device thus pretends to be the peripheral device, i.e. the entity providing the service sees the host device as the peripheral device. In the latter case, the entity providing the service is able to detect from the service request, which one of the addresses is the delivery address of the service.

As a result of this, the selected content is downloaded directly to the storage unit (steps 210 and 211). The peripheral device may acknowledge a successful download to the host device (step 212 in FIG. 3).

In one embodiment of the invention, a mechanism is added to prevent unauthorized downloads. For this purpose, the host device may use a session-specific token in the service request sent to the server providing the service. The host device may deliver this token to the peripheral device in the access profile, for example. Prior to the actual download, a check is performed between the peripheral device and the service to verify that the download is authorized by a correct party, i.e. that the peripheral device has the same token as the service received in the service request.

In the embodiment of FIG. 2, an access profile was transferred to the peripheral device from the host device. However, the peripheral device may also store one or more access profiles and the host device may just indicate when a certain access profile is to be used to access the infrastructure network. The indication may be given directly through an IBSS or an RFID interface, for example.

In one embodiment of the invention, the host device may use a user-friendly naming for the peripheral devices, and also for other host devices in the same ad-hoc network. This may be accomplished so that the user assigns a name to another device when the said another device communicates with the host device for the first time. When another device contacts the host device for the first time, the relevant application in the host device may query the user, through the user interface of the device, to assign a name for the device that just contacted the host device. When the user has supplied a name, the application maps a permanent identifier, such as the MAC address, of the communicating device to the name given by the user. This process may be performed for the peripheral devices when the host device joins the IBSS, for example. In connection with the joining, the host device may poll for the other members of the IBSS by sending a broadcast message requesting the other members of the IBSS to respond. For each response including a MAC address not known before, the user may then be queried to give a name for the responding device. This process may also be performed when the peripheral device informs the host device that it has accessed the network. If there is no stored mapping of the MAC address of the peripheral device to a user-given name, the user may be queried to assign a name for the peripheral device.

In this way, the user may recognize other devices based on his or her own names, not based on the network addresses of the devices or on the names or identities that the users of the said other devices have given, which helps operation in a multi-device environment. For example, each storage unit may be named according to its content.

Figure 4:
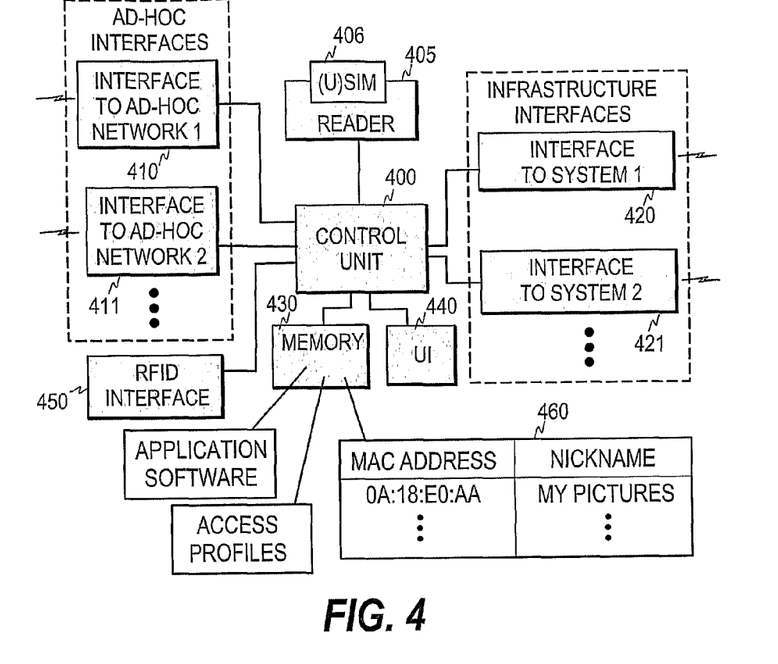
FIG. 4 is a block diagram illustrating the basic elements of a terminal according to one embodiment of the invention.

FIG. 4 is a schematic presentation of one embodiment of a host device according to the invention. The core of the terminal is a control unit 400, which is connected to various interfaces of the terminal and to a memory unit 430. The interfaces of the device may be divided into two classes: interfaces for ad-hoc networks and interfaces for the network infrastructure. However, depending on the type of the mobile terminal, it may be provided with one physical radio interface only.

In case of physically separate ad-hoc and infrastructure interfaces, there may be one or more ad-hoc interfaces 410, 411, each offering the functionality needed to accomplish connectivity to an ad-hoc network of a particular type, and one or more infrastructure interfaces 420, 421 for connecting the terminal to the network infrastructure. Several ad-hoc interfaces are necessary whenever the mobile terminal acts as a trunk terminal that serves ad-hoc networks based on different radio technologies. For example, one ad-hoc network served may be based on WLAN technology, while another one may be based on Bluetooth or Ultra-Wideband (UWB) technology. At least one of the infrastructure interfaces is typically used to transfer packet data traffic through the access network. The terminal may also comprise another short-range radio interface, such as an RFID interface 450, in addition to or instead of the ad-hoc interface(s).

The terminal normally also includes a card reader 405 into which an identity module, such as a (Universal Subscriber Module ((U)SIM), User Identity Module (UIM) or a (User) Integrated Circuit Card ((U)ICC) 406 can be inserted. The card reader and the memory unit are connected to the control unit in order that the control unit is able to read data from the identity module and from the memory unit and write data into the identity module and into the memory unit. In addition, the mobile terminal includes user interface means 440 for using the terminal. The user interface means typically include a display and a keypad.

By executing the application software stored in the memory unit and by using the data stored in the memory unit and/or in the identity module and the input data supplied by the user through the user interface means, the control unit performs the above-described steps of informing that peripheral device that an infrastructure network providing services is to be accessed, selecting a service from the infrastructure network, and indicating that the peripheral device requests the service delivery. The memory unit may further include the data needed to map the MAC addresses of the peripheral devices to their nicknames. This data may be in the form of a table 460, for example. In the example of FIG. 4, the nickname given to storage unit 121 is "My pictures".

Figure 5A:
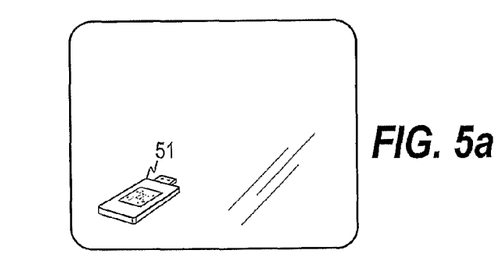
FIGS. 5a to 5c illustrate one embodiment of the user interface of the invention.
Figure 5B:
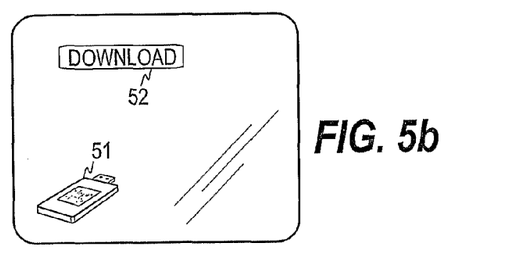
Figure 5C:
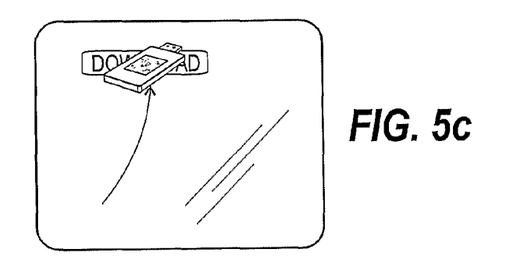

FIGS. 5a to 5c illustrate one embodiment of the user interface of the terminal by showing the display of the host device at three different stages of the above-described process. As discussed above, an icon 51 representing the peripheral device appears on the screen of the display when the peripheral device notifies the host device that it has accessed the infrastructure network (FIG. 5a). This may be handled by the control unit; when the control unit detects a relevant message from the peripheral device, it causes the icon representing the peripheral device to appear on the screen, whereby the user knows that the peripheral device is ready to receive content from the network. When the user has browsed the content and selected the content to be downloaded, an object 52 representing the download service appears on the screen (FIG. 5b). This object, from which the download may be started, may be an icon or a download button, for example. The user then creates an association between the peripheral device and the service object to indicate that the peripheral device is the destination of the download. The association may be created, for example, by dragging the icon of the peripheral device on top of the service object 52, as is illustrated in FIG. 5c.

Upon detecting the creation of the association between the peripheral device and the service, the control unit knows that the destination address to be used when communicating with the entity providing the service is the address of the peripheral device. Thus, the user may download the content to the wireless peripheral device by creating an association between the graphical representations of the peripheral device and the service on the screen, and to his/her own terminal by directing a normal user-operation to the service object, such as a double-click. Different user interface mechanisms may be used to create the association that causes the control unit to use the network address of the peripheral device as the destination address of the service.

Although the invention was described above with reference to the examples shown in the appended drawings, it is obvious that the invention is not limited to these, but may be modified by those skilled in the art without departing from the scope and spirit of the invention. Thus, although the invention was illustrated above with the help of the IEEE 802.11 standard, the invention may also be used in connection with any similar communication system where the devices may communicate locally and access a service providing network.

The invention claimed is:

1. A method comprising:
   causing a wireless peripheral device to be informed that an infrastructure network providing services is to be accessed, wherein causing the wireless peripheral device to be informed comprises causing a wireless host device to instruct the wireless peripheral device to establish a connection to the infrastructure network; and
   responsive to a selection of a service from the infrastructure network, the selection being performed at the wireless host device, causing an indication to be sent to an entity providing the service, the indication indicating that the peripheral device requests the service,
   wherein the connection between the wireless peripheral device and the infrastructure network enables data sent to the wireless peripheral device by the entity providing the service to be sent directly to the wireless peripheral device via the connection without being routed through the wireless host device.

2. A method according to claim 1, wherein the selection includes selecting content to be downloaded to the wireless peripheral device.

3. A method according to claim 1, further comprising receiving, at the wireless host device, the wireless peripheral device's network address in the infrastructure network.

4. A method according to claim 3, wherein receiving the wireless peripheral device's network address comprises receiving the network address via an access point of the infrastructure network.

5. A method according to claim 3, wherein receiving the wireless peripheral device's network address comprises receiving a frame broadcast in an ad-hoc network including the wireless host device and the wireless peripheral device, the frame including the network address of the wireless peripheral device in the infrastructure network.

6. A method according to claim 3, wherein receiving the wireless peripheral device's network address comprises receiving a network address transferred through a radio frequency identification (RFID) interface.

7. A method according to claim 3, wherein receiving the wireless peripheral device's network address comprises receiving a permanent identity of the wireless peripheral device.

8. A method according to claim 7, further comprising:
   creating an association between the permanent identity and a user selected name; and
   causing the association to be stored in the wireless host device.

9. A method according to claim 3, wherein the indication further indicates the network address of the wireless peripheral device in the infrastructure network.

10. A method according to claim 1, wherein causing the wireless peripheral device to be informed comprises causing the wireless peripheral device to be notified of an access profile to be used, the access profile including parameters for accessing the infrastructure network.

11. A method according to claim 10, wherein causing the wireless peripheral device to be notified comprises causing the access profile to be transferred to the wireless peripheral device.

12. A method according to claim 11, wherein causing the access profile to be transferred comprises causing the access profile to be sent in an ad-hoc network including the wireless host device and the wireless peripheral device.

13. A method according to claim 10, wherein causing the wireless host device to instruct the wireless peripheral device to establish a connection to the infrastructure network comprises causing the wireless peripheral device to be instructed to access the infrastructure network according to at least one of the parameters in the access profile.

14. A method according to claim 10, wherein causing the wireless peripheral device to be notified comprises causing the wireless peripheral device to be notified of the access profile through a radio frequency identification (RFID) interface.

15. A method according to claim 1, wherein the entity providing the service is configured to check whether one or more of the wireless host device or the wireless peripheral device is an authorized party, wherein the entity providing the service is configured to deliver the service to the wireless peripheral device only if the one or more of the wireless host device or the wireless peripheral device is an authorized party.

16. A system comprising:
  means for causing a wireless peripheral device to be informed that an infrastructure network providing services is to be accessed;
  means, responsive to being informed, for causing establishment of a connection between the infrastructure network and the wireless peripheral device; and
  means, responsive to a selection of a service available in the infrastructure network, for causing an indication to be sent to an entity providing the service, the indication indicating that the peripheral device requests the service;
  wherein the means for causing an indication to be sent reside in a wireless host device other than said wireless peripheral device, the wireless host device being operable by a user, and
  wherein the connection between the wireless peripheral device and the infrastructure network enables data sent to the wireless peripheral device by the entity providing the service to be sent directly to the wireless peripheral device via the connection without being routed through the wireless host device.

17. A system according to claim 16, wherein the wireless host device and the wireless peripheral device are wireless local area network (WLAN) compatible devices.

18. An apparatus comprising at least one controller and at least one memory storing computer program code, wherein the at least one memory and stored computer program code are configured, with the at least one controller, to cause the apparatus to at least:
  cause a wireless peripheral device to be informed that an infrastructure network providing services is to be accessed, including causing the wireless peripheral device to be instructed to establish a connection to the infrastructure network; and
  responsive to a selection of a service from the infrastructure network, the selection being performed at the wireless host device, cause an indication to be sent to an entity providing the service, the indication indicating that the wireless peripheral device requests the service,
  wherein the connection between the wireless peripheral device and the infrastructure network enables data sent to the wireless peripheral device by the entity providing the service to be sent directly to the wireless peripheral device via the connection without being routed through the apparatus.

19. An apparatus according to claim 18, wherein the at least one memory and stored computer program code are configured, with the at least one controller, to cause the apparatus to cause the wireless peripheral device to be notified of an access profile to be used, the access profile including parameters for accessing the infrastructure network.

20. An apparatus according to claim 19, wherein the at least one memory and stored computer program code are configured, with the at least one controller, to cause the apparatus to cause a service request to be sent to the infrastructure network, the service request including a network address of the wireless peripheral device.

21. An apparatus according to claim 20, wherein the service request and the access profile include a session-specific authorization token.

22. An apparatus according to claim 18, wherein the at least one memory and stored computer program code are configured, with the at least one controller, to cause the apparatus to receive the wireless peripheral device's network address in the infrastructure network.

23. An apparatus according to claim 18, wherein the apparatus comprises a wireless local area network (WLAN) compatible terminal.

24. An apparatus according to claim 18, wherein the apparatus comprises or is embodied on a mobile phone, the mobile phone comprising a user interface configured to facilitate user control of at least some functions of the mobile phone through use of a display.

25. A computer program product comprising at least one non-transitory computer readable storage medium having computer readable program code stored therein, the computer readable program code comprising:
  a computer readable program code portion configured to cause a wireless host device to inform a wireless peripheral device that an infrastructure network providing services is to be accessed, wherein the computer readable program code portion configured to cause the wireless host device to inform the wireless peripheral device comprises a program code portion configured to cause the wireless host device to instruct the wireless peripheral device to establish a connection to the infrastructure network; and
  a computer readable program code portion configured, responsive to a selection of a service from the infrastructure network, to cause the wireless host device to indicate to an entity providing the service in the infrastructure network that the wireless peripheral device requests the service,
  wherein the connection between the wireless peripheral device and the infrastructure network enables data sent to the wireless peripheral device by the entity providing the service to be sent directly to the wireless peripheral device via the connection without being routed through the wireless host device.

26. An apparatus comprising at least one controller and at least one memory storing computer program code, wherein the at least one memory and stored computer program code are configured, with the at least one controller, to cause the apparatus to at least:

receive an instruction from a wireless host device that an infrastructure network is to be accessed;

cause, responsive to the received instruction, establishment of a connection to the infrastructure network; and receive data from an entity of the infrastructure network providing a service, the service having been selected by the wireless host device, wherein the data is received directly via the connection between the apparatus and the infrastructure network without being routed through the wireless host device;

wherein the apparatus comprises or is embodied on a wireless peripheral device.

* * * * *